US010809992B1

(12) United States Patent
Kondo

(10) Patent No.: US 10,809,992 B1
(45) Date of Patent: Oct. 20, 2020

(54) METHOD AND APPARATUS FOR CONTINUOUS DELIVERY OF PERMISSIONED BLOCKCHAIN APPLICATION

(71) Applicant: HITACHI, LTD., Chiyoda-ku, Tokyo (JP)

(72) Inventor: Yuki Kondo, Cupertino, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/396,373

(22) Filed: Apr. 26, 2019

(51) Int. Cl.
G06F 8/60 (2018.01)
G06F 11/36 (2006.01)
G06F 8/70 (2018.01)
H04L 29/08 (2006.01)

(52) U.S. Cl.
CPC ............. *G06F 8/60* (2013.01); *G06F 8/70* (2013.01); *G06F 11/3688* (2013.01); *G06F 11/3692* (2013.01); *H04L 67/34* (2013.01)

(58) Field of Classification Search
CPC ......... G06F 11/3688; G06F 8/70; G06F 8/60; G06F 11/3692; H04L 67/34
USPC ....................................... 717/100, 124–135
See application file for complete search history.

(56) References Cited

U.S. PATENT DOCUMENTS

| 8,677,315 B1* | 3/2014 | Anderson | G06F 9/4411 |
| | | | 717/110 |
| 10,373,158 B1* | 8/2019 | James | G06Q 20/3829 |
| 10,552,556 B2* | 2/2020 | Kikinis | G06F 30/20 |
| 2010/0058294 A1* | 3/2010 | Best | G06F 11/3688 |
| | | | 717/122 |
| 2017/0115976 A1 | 4/2017 | Mills | |
| 2019/0036698 A1* | 1/2019 | Anglin | H04L 9/3242 |
| 2019/0140935 A1* | 5/2019 | Kikinis | G06F 16/182 |
| 2019/0222424 A1* | 7/2019 | Lindemann | H04L 9/0861 |
| 2019/0273610 A1* | 9/2019 | Fan | H04L 9/34 |
| 2019/0354614 A1* | 11/2019 | Chui | H04L 9/3247 |
| 2020/0007513 A1* | 1/2020 | Gleichauf | H04L 9/3239 |
| 2020/0019706 A1* | 1/2020 | Zhu | H04L 9/0637 |
| 2020/0076613 A1* | 3/2020 | Ciscato | H04L 9/3236 |
| 2020/0133658 A1* | 4/2020 | Agrawal | G06F 8/70 |

* cited by examiner

Primary Examiner — Marina Lee
(74) Attorney, Agent, or Firm — Procopio, Cory, Hargreaves & Savitch LLP

(57) ABSTRACT

Method and apparatus for continuous delivery of permissioned blockchain application is a solution for the distributed continuous delivery system making all organization verify moving forward to the next step in the pipeline according to the results shared on blockchain. The status is managed by continuous delivery manager implemented as a blockchain application (a.k.a. smart contract). A method also includes the distributed environment where all organization run tests by themselves.

10 Claims, 12 Drawing Sheets

500

| jobID | status | nextJobID | assignPolicy |
|---|---|---|---|
| startLocal | localTestStarted | updateLocal | ALL_ORG |
| updateLocal | localTestEnded | verifyLocal | ONE_ORG |
| verifyLocal | localTestVerified | startStaging | ONE_ORG |
| startStaging | stagingTestStarted | updateStaging | ONE_ORG |
| updateStaging | stagingTestEnded | verifyStaging | ONE_ORG |
| verifyStaging | stagingTestVerified | startSigning | ONE_ORG |
| startSigning | signStarted | updateSigning | ALL_ORG |
| updateSigning | signEnded | updateMerge | ONE_ORG |
| updateMerge | artifactMerged | startDeployment | ONE_ORG |
| startDeployment | deployStarted | updateDeployment | ALL_ORG |
| updateDeployment | deployEnded | verifyDeployment | ONE_ORG |
| verifyDeployment | deployVerified | finished | - |

| changeID | jobID | orgID | result | updated time |
|---|---|---|---|---|
| 102 | updateLocal | Org 1 | Success | 01/15/2019 |
| 102 | updateLocal | Org 2 | Success | 01/15/2019 |
| 102 | updateLocal | Org 3 | Failure | 01/15/2019 |
| 101 | verifyStaging | Org 2 | Success | 01/10/2019 |
| ... | | | | |

FIG. 7

METHOD AND APPARATUS FOR CONTINUOUS DELIVERY OF PERMISSIONED BLOCKCHAIN APPLICATION

BACKGROUND

Field

The present disclosure relates generally to cloud based systems, and more specifically, to facilitating continuous delivery for cloud based systems through the use of blockchain.

Related Art

In the related art there are systems and methods to manage highly scalable continuous delivery pipelines for applications deployed on a cloud-based service or hybrid cloud/enterprise system. The continuous delivery is a series of jobs into some sort of pipeline where they are orchestrated to take the software product from source code, through compilation and testing into deployment, approvals and delivery. The continuous delivery server manages the process of pipelines.

When managing continuous delivery in a system with a complex topology, jobs may need to be allocated to workers across multiple physical servers, networks, domains, and firewalls. The problem is that a centralized server may not be able to manage all jobs in the pipeline due to access control restrictions.

To address such issues, the related art involves solutions such as having an entire plan for a build pipeline written into a job package. Further, there are multiple build workers working on different servers in related art implementations. Each build worker is assigned to a job in the pipeline. The build worker receives a job package, perform a job and record the result of the job. For example, the first job is executed by the build worker A and the second job is executed by the build worker B. The result of a job executed by a build worker is shared with other build workers. For sharing the results, implementations such as blockchain or databases are used.

SUMMARY

In the related art, however, there is no implementation to verify the results of the jobs before proceeding to the next job in the pipeline. Example implementations described herein involve ensuring that all build workers verify the results of jobs before moving forward to the next job in the pipeline.

Aspects of the present disclosure can involve a method for managing deployment of source code to a production repository across a plurality of independently managed entities through a blockchain, the method involving for a submission of the source code for deployment, testing the source code on a first network that is local to each of the plurality of independently managed entities. For results of the testing being verified in the blockchain as valid, conducting staging on a second network to verify the testing across each of the plurality of independently managed entities. For results of the staging being signed by each of the plurality of independently managed entities in the blockchain, deploying the source code in a third network configured to deploy the source code to each of the plurality of independently managed entities.

Aspects of the present disclosure can involve a computer program with instructions for managing deployment of source code to a production repository across a plurality of independently managed entities through a blockchain, the instructions involving for a submission of the source code for deployment, testing the source code on a first network that is local to each of the plurality of independently managed entities. For results of the testing being verified in the blockchain as valid, conducting staging on a second network to verify the testing across each of the plurality of independently managed entities. For results of the staging being signed by each of the plurality of independently managed entities in the blockchain, deploying the source code in a third network configured to deploy the source code to each of the plurality of independently managed entities. The instructions may be stored on a non-transitory computer readable medium and executed by one or more processors.

Aspects of the present disclosure can involve a system for managing deployment of source code to a production repository across a plurality of independently managed entities through a blockchain, that involves a first network that is local to each of the plurality of independently managed entities that is configured to test the source code; a second network configured to, for results of the test being verified in the blockchain as valid, conduct staging to verify the testing across each of the plurality of independently managed entities; and a third network configured to, for results of the staging being signed by each of the plurality of independently managed entities in the blockchain, deploy the source code to each of the plurality of independently managed entities.

Aspects of the present disclosure can involve a system for managing deployment of source code to a production repository across a plurality of independently managed entities through a blockchain, the system involving for a submission of the source code for deployment, means for testing the source code on a first network that is local to each of the plurality of independently managed entities. For results of the testing being verified in the blockchain as valid, means for conducting staging on a second network to verify the testing across each of the plurality of independently managed entities. For results of the staging being signed by each of the plurality of independently managed entities in the blockchain, means for deploying the source code in a third network configured to deploy the source code to each of the plurality of independently managed entities.

BRIEF DESCRIPTION OF DRAWINGS

FIG. 5 illustrates an example data structure of the job definition table, in accordance with an example implementation.

FIG. 7 illustrates an example data structure of log table, in accordance with an example implementation.

DETAILED DESCRIPTION

Figure 1:
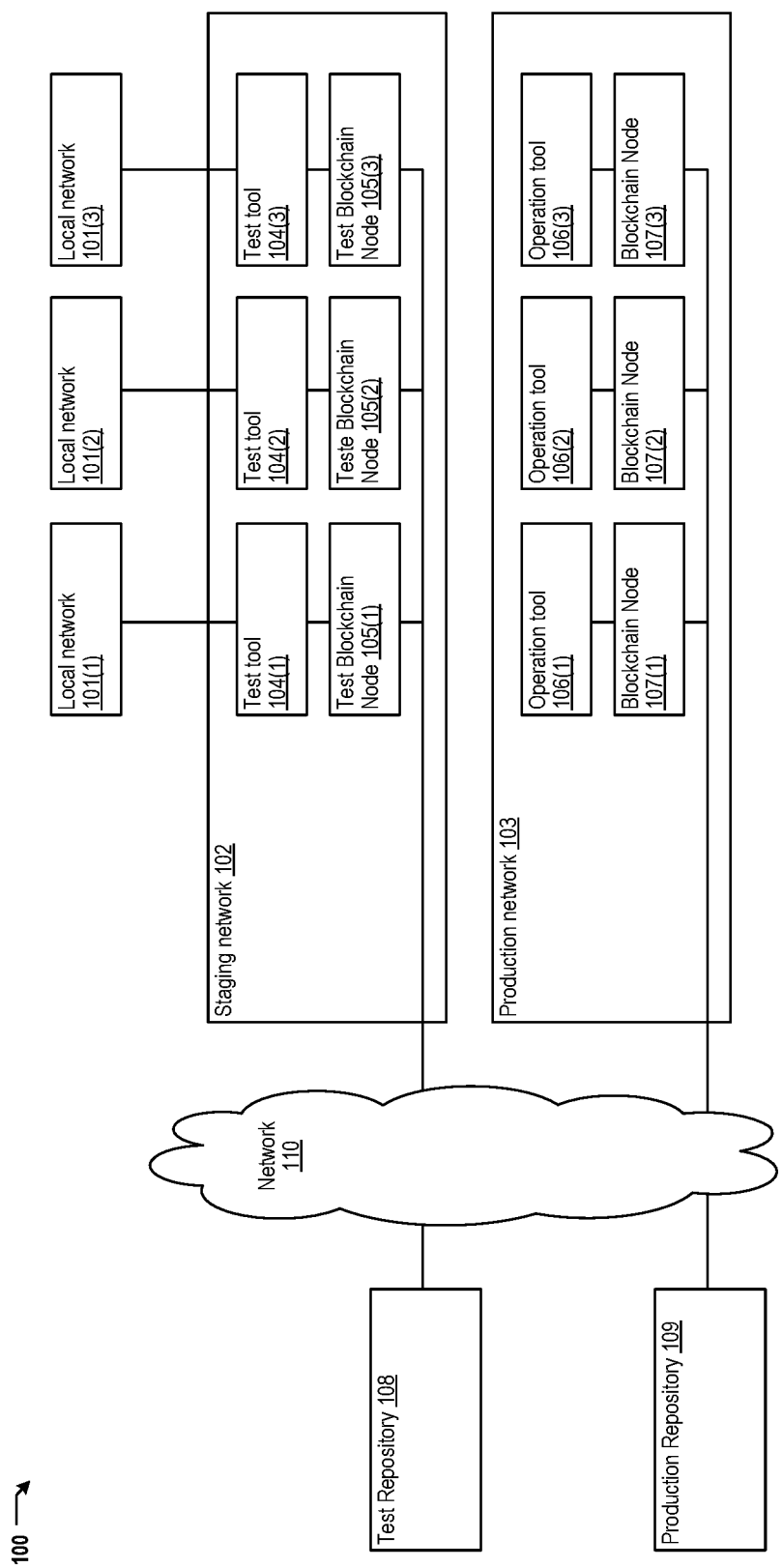
FIG. 1 illustrates an example system architecture of a blockchain network topology, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Continuous delivery (CD) is a software development practice where code changes are prepared for a release in short cycles, usually with a high degree of automation. The purpose is to make feedback loops as short as possible to improve software quality.

In CD, automated builds, tests and staging deployments are integrated into one continuous process. Every code change is built, tested, and then pushed to a staging environment. In the staging environment, there are multiple tests like UI testing, integration testing, performance testing, load testing and reliability testing before a production network. To automate the process, CD tools are used in development teams.

Blockchain is a database distributed and shared among the nodes participating in a network. Blockchain is essentially an append-only database. As the name of blockchain shows, blockchain involves a chain of blocks. Each block contains a list of transactions. Each block is linked to the previous block with a cryptographic hash. The nodes maintain the state of blockchain and execute transactions to modify the state. Blockchain is also known as distributed ledger technology.

A blockchain system involves of multiple nodes operated by different organizations which do not fully trust each other. All nodes in a blockchain network agree on the transactions and the order of transactions stored on the blockchain. The mechanism for agreement is known as a consensus algorithm. There are various consensus algorithms, such as Proof-of-Work (PoW), which makes nodes execute heavy mathematical computations during consensus in public network. When nodes are authenticated in a closed private network, fault-tolerant consensus protocols such as Raft, Paxos and PBFT are used.

Financial institutions and other companies have been developing blockchain applications. There is an expectation that blockchain will transform their business process and create new services. The benefit of blockchain is decentralized governance, immutability and transparency. In blockchain network, each node executes the same transaction and has the same state. It is possible to facilitate transactions without having a privileged third party. Data on blockchain is immutable because the chain of hashes prevents the transaction history from being changed. Since distributed data maintains transparency between stakeholders, blockchain reduces the cost of communication and audit beyond organizations.

There are two types of blockchain platform software, which are "permissionless blockchain" and "permissioned blockchain". As the name shows, permissionless blockchain allows everyone to join the blockchain network and operate blockchain nodes. On the other hand, permissioned blockchain requires authentication of a user before joining the blockchain network. Only the authenticated user can operate blockchain nodes. In various use cases, companies use permissioned blockchain because general business transactions are executed between organizations having an eligible identity. For this reason, example implementations described herein are focuses on permissioned blockchain.

When using permissioned blockchain, organizations create a consortium to run applications in a blockchain network. In the blockchain network, all participating organizations have the same applications. These applications are executed by all organizations to run and record transactions. When any organization develops and modifies an application in the consortium, all organizations need to approve the artifacts before deploying them to the blockchain network. Every organization has the right and responsibility for the application. This governance policy maintains the equal relationship in the consortium.

Test results are used to approve the artifact content. If all test cases pass successfully, the artifacts are approved by organizations. Usually, tests include Unit test (UT), Integration test (IT) and System test (ST). To ensure that participating organizations approve the content of artifacts (e.g. smart contract, configuration), the organizations put digital signatures to the artifacts off-the-band. After that, the signed artifacts are deployed to the production network.

However, there is no end-to-end CD method for permissioned blockchain applications. If the related art CD methods are applied to permissioned blockchain applications, there are some problems as follows.

Going to the next step without verification from all organizations: The status of a CD pipeline is managed by a single server in an organization. When moving forward to the next step in the pipeline, this server verifies the job results and renders a decision. Other organizations must trust the status managed by a single organization. This restriction conflicts with the basic trust assumption in the blockchain network as each organization should have the equal power.

Approval without verification of own test results: For some tests like UT and IT, only an organization runs tests. Other organizations have to approve the artifacts without running tests by themselves. Since they do not have test results, they rely on the test results executed by a single organization. This restriction conflicts with the basic trust assumption in blockchain network. Each organization should have the equal power. For example, the CD server asks organization 1 to run UT and IT. Other organizations 2, 3, and 4 do not run tests. Organizations 2, 3 and 4 have to approve the artifacts based on the test result executed by organization 1.

Unknown status beyond organizations: It is unclear if each organization deploys the signed artifact to production network. Deployment operation is executed by each organization. CD server does not know if each organization deploys the approved artifact to production network. Some organizations may accidentally deploy different artifacts or forget to deploy them.

To solve these problems, example implementations described herein involve the following solution, which is a method including the distributed continuous delivery system making all organization verify moving forward to the next step in the pipeline according to the results shared on blockchain. The status is managed by CD manager implemented as a blockchain application (a.k.a. smart contract). A method also includes the distributed environment where all organization run tests by themselves.

Example implementations facilitate verification by all organizations through a CD manager that controls the status of a pipeline throughout its lifetime. For example, the pipeline can involve the following stages:

Local stage: An artifact is pushed to the repository for test. Every organization runs unit test and integration test in local network.

Staging stage: System test is executed in the staging network. After passing the test, every organization puts digital signature to artifacts. After that, the signed artifact is merged to the repository for production network.

Deploy stage: Every organization deploys the signed artifact to production network.

Before going to the next step, every organization runs the CD manager to verify if all organizations agree on changing the status. For example, the CD manager is configured to verify if all organizations passed unit tests and integration tests successfully before moving forward to the staging stage. The CD manager is also configured to verify if all organizations passed system tests successfully before signing artifacts. The CD manager is also configured to verify if all organizations signed artifacts before pushing artifacts to the production repository and to verify if all organizations deployed the signed artifacts to production network.

In example implementations, the CD manager is implemented as a blockchain application. The functions to control the status of a pipeline are implemented as a blockchain application. Blockchain application is hosted and executed by all organizations in a blockchain network. Since the CD manager is a blockchain application, it is executed by all organizations in a blockchain network. This means that CD server is decentralized. Further, CD managers receive the job results and write them to blockchain. The results are shared among all organizations. Every organization can get results executed by other organizations. When verifying the changing of the CD status, the CD manager reads the result from the blockchain.

Example implementations further involve a distributed environment, in which there can be a local network, staging network and production network. Each environment is used for different purpose which can involve the following. The local network is an environment for the local stage, which is configured to run test cases in each organization. The staging network is an environment for the staging stage which is configured to run test cases beyond organizations. The production network is an environment for production which is configured to run blockchain applications as a production service. Every organization has an environment for all of the stages. Since every organization runs tests by themselves on these environments, the results of test can thereby be trusted by each organization.

Figure 2:
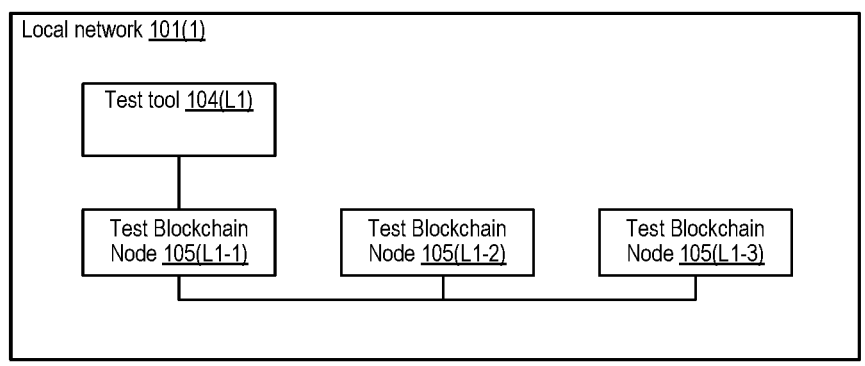
FIG. 2 illustrates an example system structure of a local network, in accordance with an example implementation.
Figure 10:
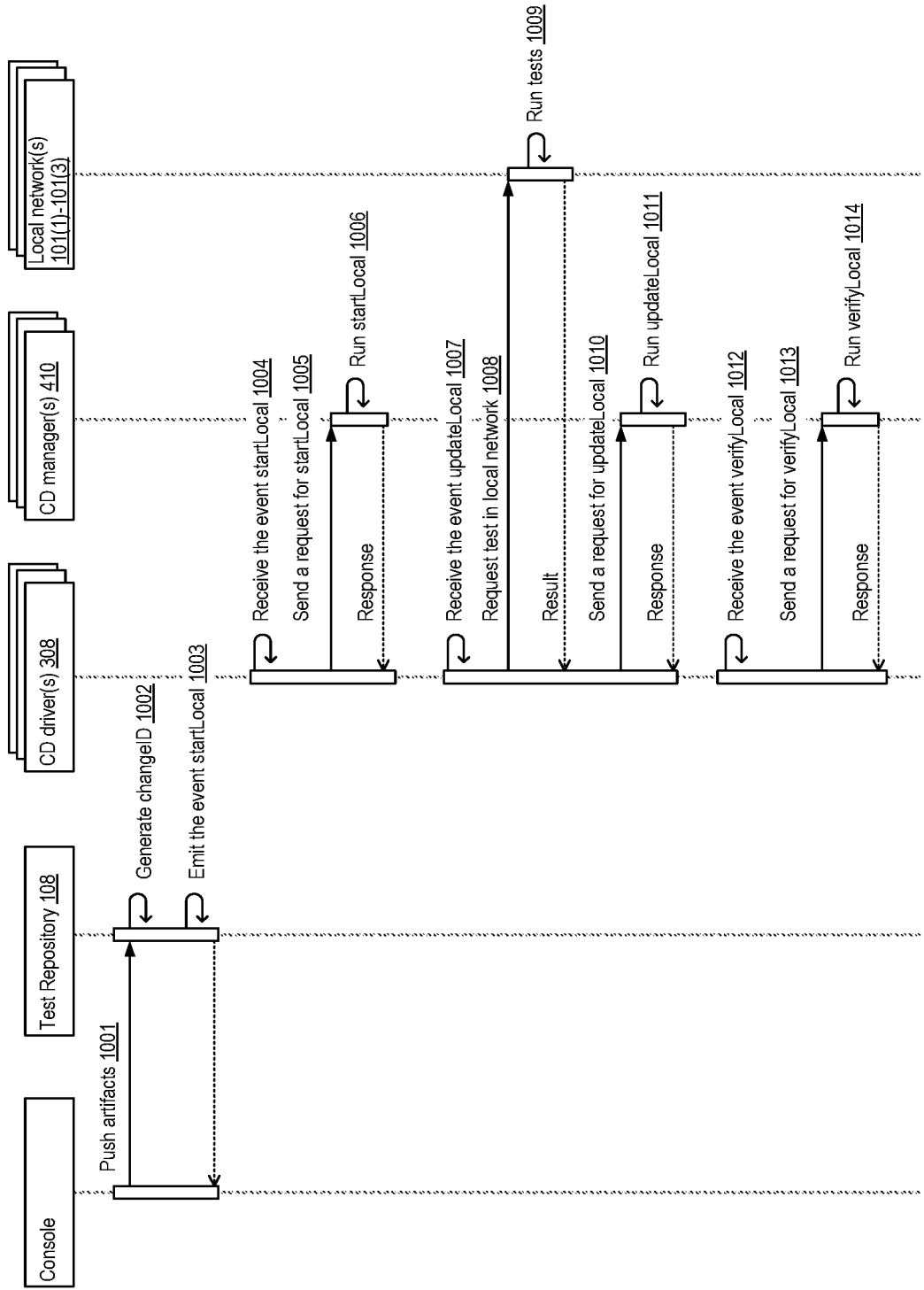
FIG. 10 is a sequence diagram illustrating an example process of local stage, in accordance with an example implementation.

In a first example implementation, there is described herein a method and apparatus for continuous delivery of permissioned blockchain application. As will be described herein, a system involving three networks (a local network, a staging network, a production network) will be utilized to manage and verify the deployment of source code to a production repository and to each of a plurality of independently managed entities (i.e. organizations as described herein) through utilization of a block chain. As will be described herein, for a submission of the source code for deployment by an entity, the source code is tested a first network that is local to each of the plurality of independently managed entities as illustrated in FIGS. 1, 2 and 10. Should the testing be verified in the blockchain as being valid through the process of FIG. 10, staging is conducted on a second network to verify the testing across each of the plurality of independently managed entities as illustrated in FIGS. 1, 3, 4 and 11. For results of the staging being signed by each of the plurality of independently managed entities in the blockchain, the source code is deployed in a third network configured to deploy the source code to each of the plurality of independently managed entities as illustrated in FIGS. 1, and 12, wherein the source code can thereby be deployed to the production repository for verification from the plurality of independently managed entities that deployment of the source code in the third network is successful.

Through the example implementations described above, the source code is independently verified by each organization in their local network, then the results of the verification can then be verified between organizations in the staging network, and then the deployment can be verified by all of the organizations in the production network before the source code is deployed to the production repository. In this manner, no single entity needs to be relied upon for trusting the validity of the source code deployment; each organization can independent verify the deployment on their local network, and verify the deployment of other organizations on the staging network.

Figure 11:
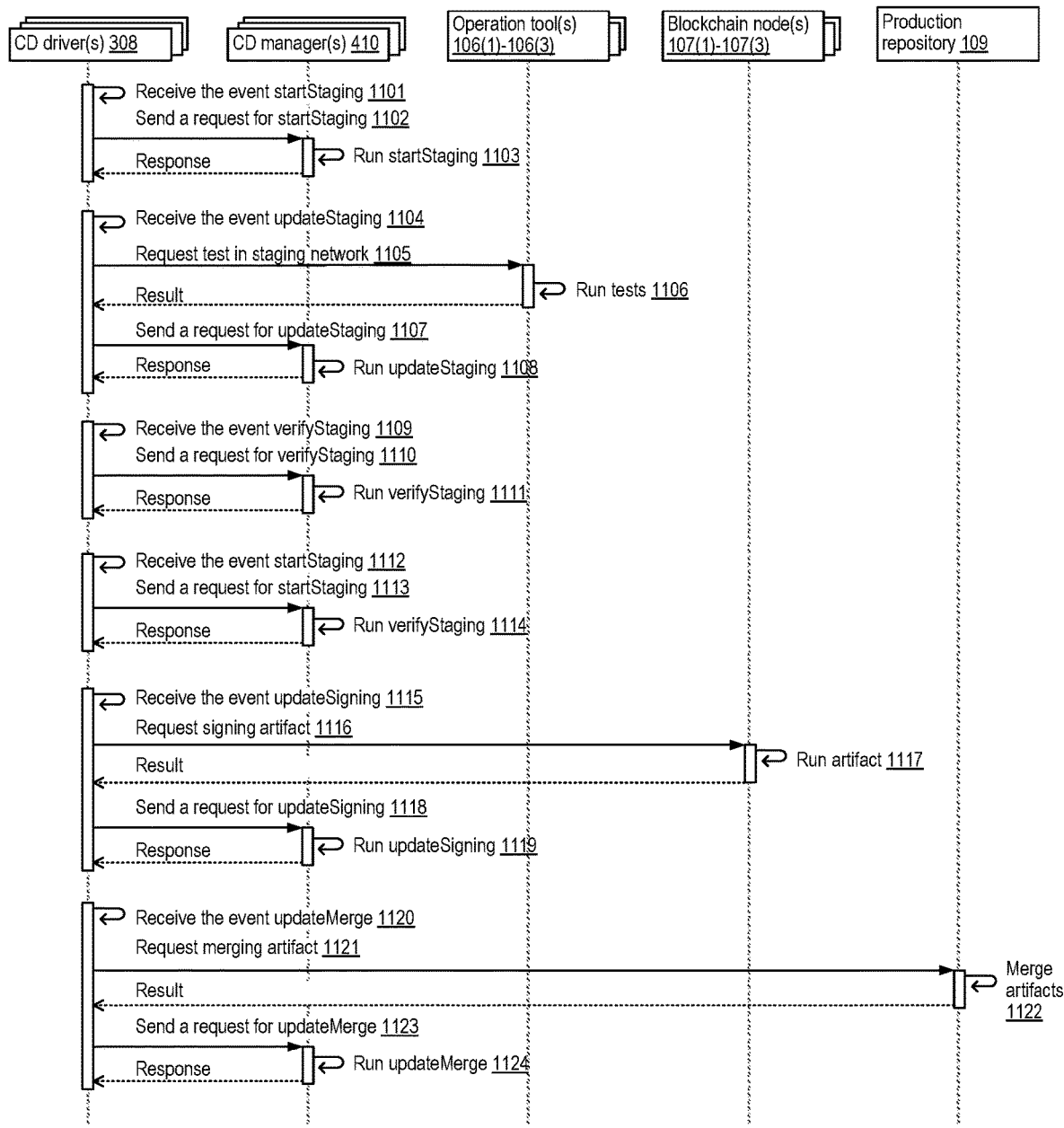
FIG. 11 is a sequence diagram illustrating an example process of the staging stage, in accordance with an example implementation.
Figure 12:
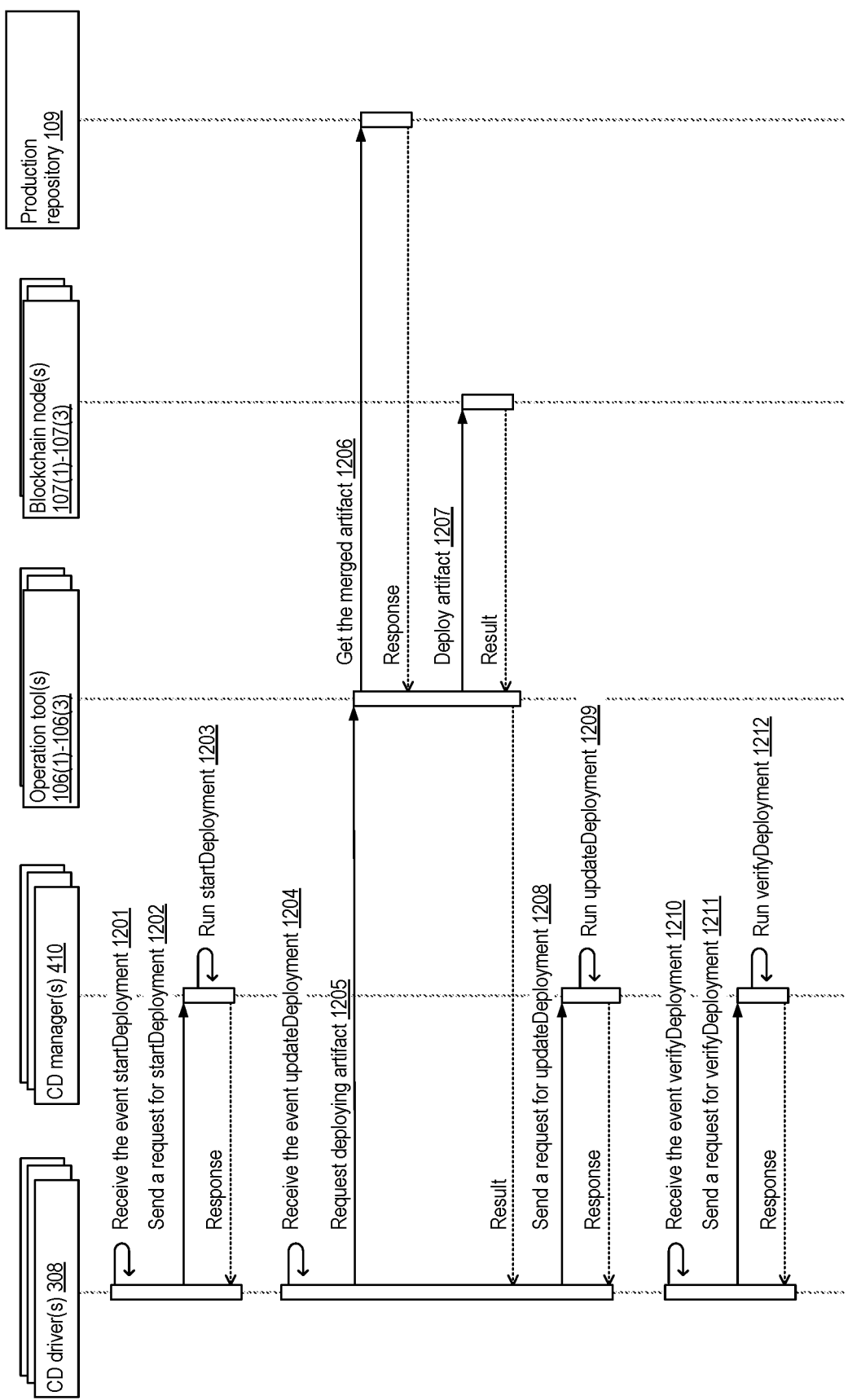
FIG. 12 is a sequence diagram illustrating an example process of the deployment stage, in accordance with an example implementation.

Further, the testing the source code on the first network, conducting staging on the second network, and deploying the source code on the third network can be executed in order as illustrated from FIGS. 10-12 to ensure that no single entity is the single point of trust in deployment of the source code.

Figure 3:
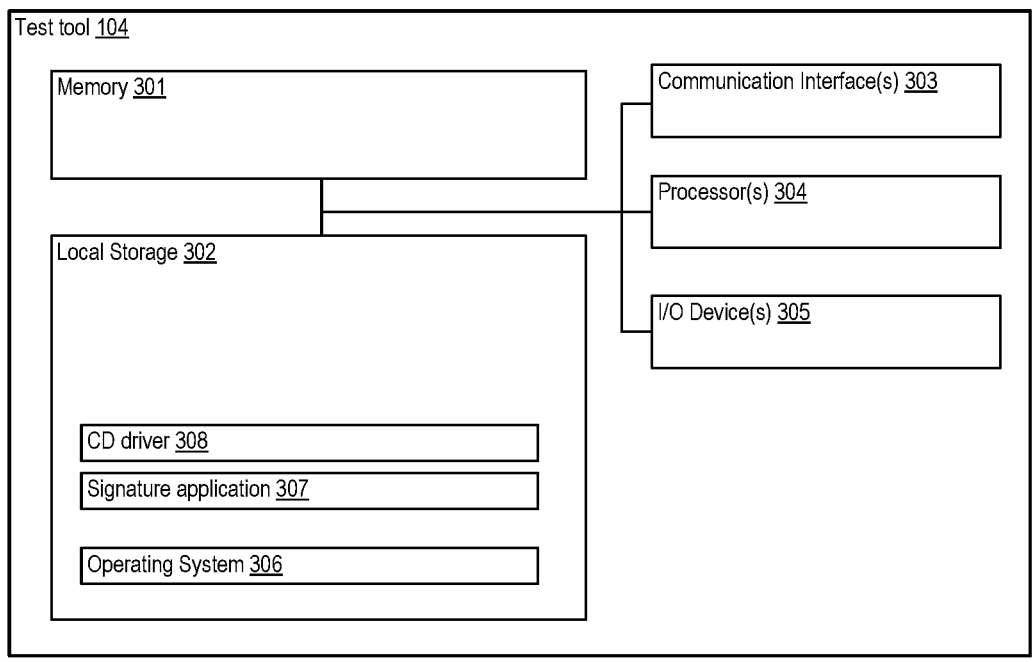
FIG. 3 illustrates an example physical configuration of a test tool, in accordance with an example implementation.

As will be described herein, the testing the source code on the first network that is local to each of the plurality of independently managed entities can involve deploying the source code to a test repository; executing a test of the source code on the first network that is local to each of the plurality of independently managed entities; and for results of the test of the source code on the first network provided from the plurality of independently managed entities as being successful, verifying the results of the testing in the blockchain as being valid as illustrated in the flow of FIG. 10. The flow of FIG. 10 is executed by the processor(s) 304 of test tool 104 as illustrated in FIG. 3.

Figure 4:
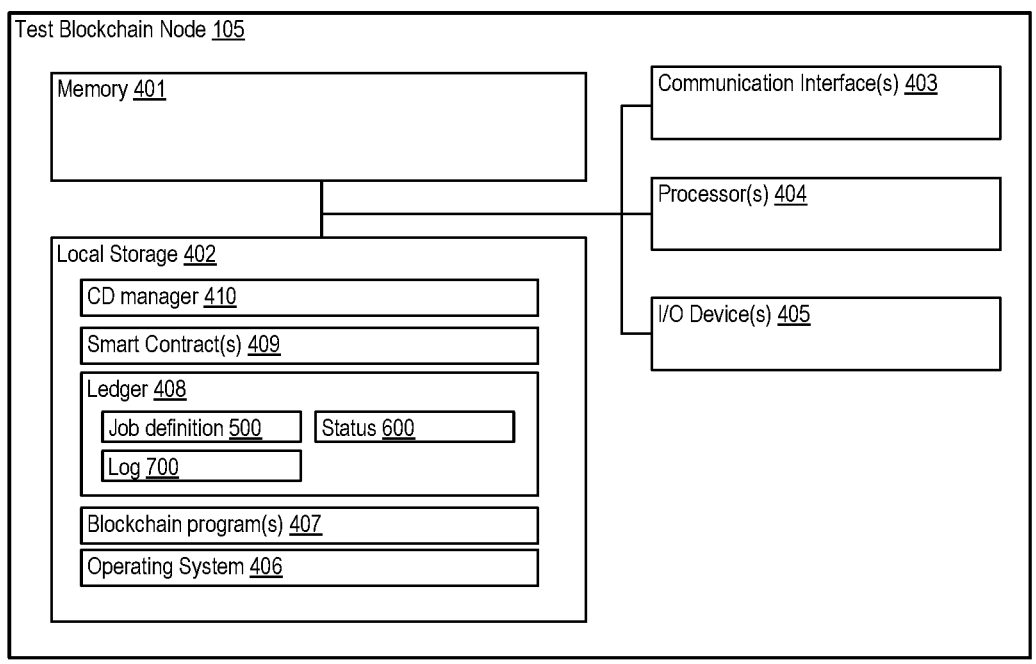
FIG. 4 illustrates an example physical configuration of a test blockchain node, in accordance with an example implementation.

As will be described herein, the conducting staging on the second network to verify the testing across each of the plurality of independently managed entities can involve executing a test of the source code on the second network through smart contracts between each of the plurality of independently managed entities; for ones of the smart contracts indicating the test to be successful, execute a signing on the blockchain between the ones of the plurality of independently managed entities associated with the ones of the smart contracts indicating the test to be successful; and merging signatures from the signing into the production repository as illustrated in the flow of FIG. 11. The flow of FIG. 11 can be executed by processor(s) 404 of test blockchain node 105 as illustrated in FIG. 4.

As will be described herein, the deploying of the source code in the third network configured to deploy the source code to each of the plurality of independently managed entities can involve obtaining merged signatures of the plurality of independently managed entities from the production repository associated with the results of the staging; deploying the merged signatures to the blockchain; and deploying the source code to each of the plurality of independently managed entities; and for verification of successful deployment of the source code to each of the plurality of entities, maintaining deployment of the source code in the production repository as illustrated in FIG. 12. The flow of FIG. 12 can be driven by CD manager 410 and CD driver 308 as executed in processor(s) 304 and 404 from FIGS. 3 and 4.

FIG. 1 illustrates an example system architecture of a blockchain network topology, in accordance with an example implementation. The system 100 involves three environments: local network 101(1)-101(3), staging network 102, and production network 103.

There are multiple local networks 101(1)-101(3) because each organization participating in the blockchain network has its own local network. For example, organization 1 has a local network 101(1), organization 2 has a local network 101(2) and organization 3 has a local network 101(3). In this example, there are three organizations with three local networks (one for each organization), but the present disclosure is not limited thereto and any number of organizations and local networks may be used in accordance with the desired implementation. The structure of a local network is described in further detail below.

Staging network 102 has test tools 104(1)-104(3) and test blockchain nodes 105(1)-105(3). Each organization has at least one test tool 104(1)-104(3) and one test blockchain node 105(1)-105(3). For example, organization 1 has a test tool 104(1) and test blockchain node 105(1). Organization 2 has a test tool 104(2) and a test blockchain node 105(2).

Production network 103 has operation tool 106(1)-106(3) and blockchain node 107(1)-107(3). Every organization has at least one operation tool 106(1)-106(3) and one blockchain node 107(1)-107(3). For example, organization 1 has an operation tool 106(1) and a blockchain node 107(1). Organization 2 has an operation tool 106(2) and a blockchain node 107(2).

There are two repositories in the system 100: test repository 108 and production repository 109. Test repository 108 stores artifacts such as application code, configuration data, test code and test data for tests in local network and staging network. Production repository 109 stores artifacts such as application code and configuration data for operations in production network. All components are connected through network 110.

FIG. 2 illustrates an example system structure of a local network, in accordance with an example implementation. In this example, local network 101(1) is illustrated, but all of the local networks can also have a similar architecture. Local network 101(1) involves a test tool 104(L) and a test blockchain node 105(L1-1), 105(L1-2), 105(L1-3). Local network is used to build and is test executed by each organization. Local network is an independent blockchain network for each organization. For example, local network 101(1) is a blockchain network for organization 1. Local network 101(1) has a test tool 104(L) operated by organization 1. Local network 101(1) also have multiple test blockchain nodes 105(L1-1), (L1-2) and (L1-3) operated by organization 1.

FIG. 3 illustrates an example physical configuration of test tool 104, in accordance with an example implementation. Test tool 104 illustrates the underlying configuration for the test tool 104(1)-104(3) as illustrated in FIG. 1. Test tool 104 involves memory 301, local storage 302, communication interface(s) 303, processor(s) 304 and I/O Devices(s) 305. Local storage 302 contains CD driver 308, signature application 307 and operating system 306.

FIG. 4 illustrates an example physical configuration of test blockchain node 105, in accordance with an example implementation. Test blockchain node 105 involves memory 401, local storage 402, communication interface(s) 403, processor(s) 404 and I/O Devices(s) 405. Local storage 402 contains CD manager 410, smart contract(s) 409, ledger 408, blockchain program(s) 407 and operating system 406. Ledger 408 contains job definition table 500, status table 600 and log table 700.

FIG. 5 illustrates an example data structure of job definition table 500, in accordance with an example implementation. This table is stored in the ledger 408. Job definition 500 defines a series of jobs in a pipeline. Each row shows a definition of a job. Column 501 shows jobID in a pipeline, which assigns a unique identifier to each job. Column 502 shows the status of a job when the job finishes successfully. Column 503 shows the nextJobID, which indicates the jobID of a job executed after the current job. Column 504 shows the assignPolicy, which indicates which organization executes the next job.

Figure 6:
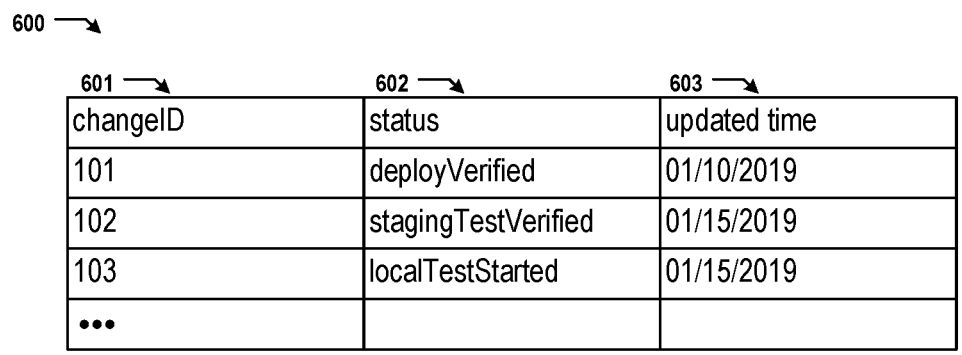
FIG. 6 illustrates an example data structure of the status table, in accordance with an example implementation.

FIG. 6 illustrates an example data structure of status table 600. This table is created in the ledger 408 by CD manager 410. Status table 600 shows the status in a pipeline. Each row is updated when CD manager 410 changes the status. Row 601 shows changeID, which is used to identify an instance of a pipeline. When a code is submitted to test repository, a new changeID is generated for the instance. Row 602 shows the status in a pipeline. The value is selected from the status 502 in job definition table 500 according to the progress of the pipeline. Row 603 shows updated time when the status is updated.

FIG. 7 illustrates an example data structure of log table 700, in accordance with an example implementation. This table is created in the ledger 408 by CD manager 410. Log table 700 stores the results of jobs executed throughout the pipeline. Each row is created when CD manager 410 updates the result of a job. Row 701 shows a changeID of an instance of pipeline. Row 702 shows jobID which is executed. Row 703 shows orgID, which indicates the organization that executed a job. Row 704 shows result of the job. The value is set to success or failure according to the result of a job. Row 705 shows the updated time when the log is updated.

Figure 8:
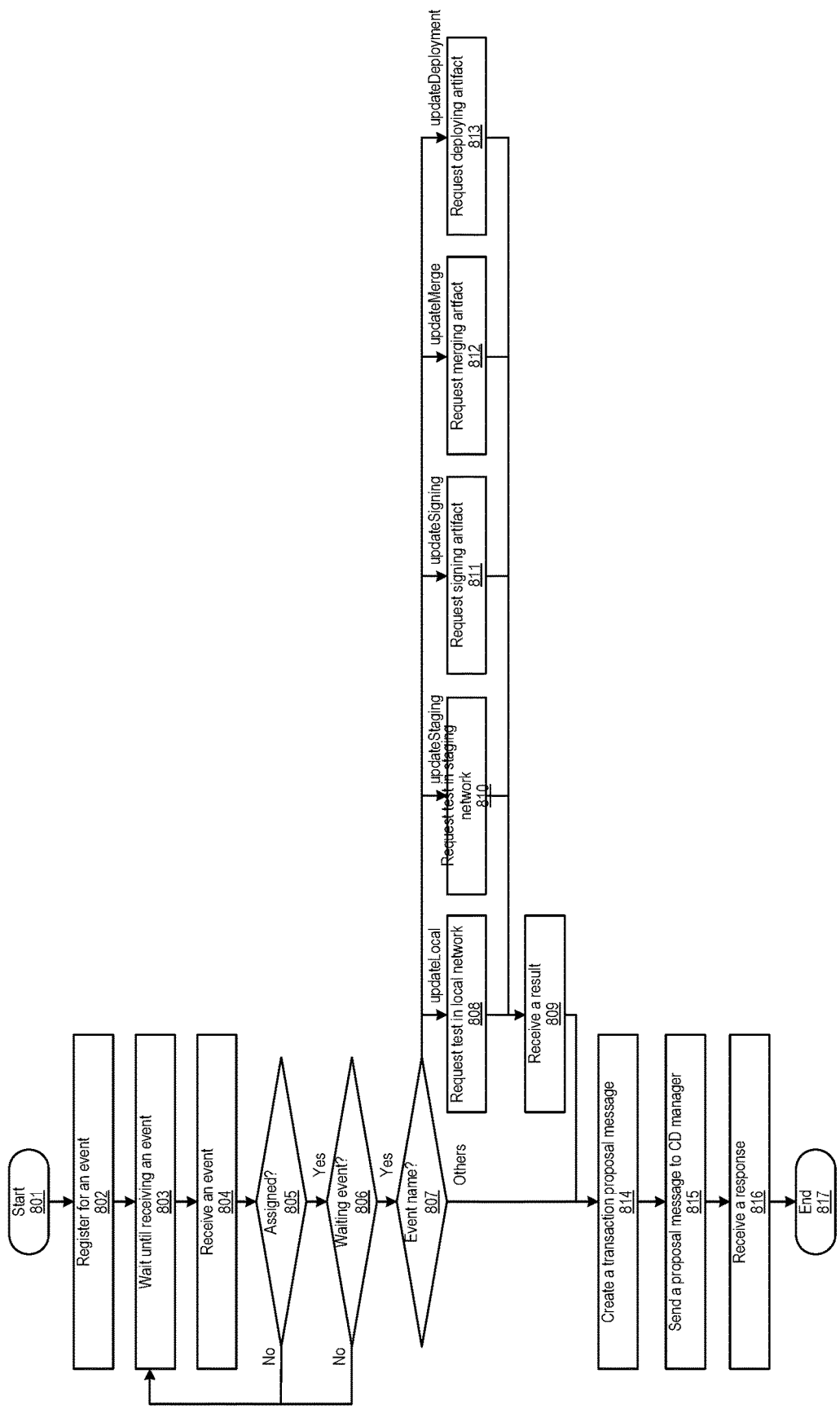
FIG. 8 illustrates a flow diagram for an example process of CD driver, in accordance with an example implementation.

FIG. 8 illustrates a flow diagram for an example process of CD driver 308, in accordance with an example implementation. CD driver 308 requests running tests, signing artifacts, merging artifacts and deploying artifacts according to the event the CD driver 308 receives. CD driver 308 also sends a transaction proposal message to CD manager(s) 410 and receives a response.

The procedure starts at 801. When starting the CD driver 308, it receives a name of an event to register. The CD driver 308 is executed by all organizations. Each instance of CD driver 308 has a name of the organization. At 802, the CD driver 308 registers for an event. At 803, CD driver 308 listens to events on the network 110 and waits until receiving an event. At 804, CD driver 308 receives an event. At 805, CD driver 308 checks the value of the assignee field in the received event. If the organization running the CD driver 308 matches the assignee or the assignee is empty (Yes), the flow proceeds to 806. If the organization running the CD driver 308 does not match the assignee (No), the flow proceeds back to 803 to wait for the next event.

At 806, the CD driver 308 checks the value of the eventname field in the received event. If the eventname matches the name of the registered event determined from 802 (Yes), the flow proceeds to 807, otherwise (No) the flow proceeds back to 803 to wait for the next event.

At 807, the CD driver 308 checks the value of the eventname field in the received event to route the process according to the received event. If the eventname is "updateLocal", then the flow proceeds to 808. If the eventname is "updateStaging", then the flow proceeds to 810. If the eventname is "updateSigning", then the flow proceeds to 811. If the eventname is "updateMerge", then the flow proceeds to 812. If the eventname is "updateDeployment", then the flow proceeds to 813. If the eventname does not match anything above, then the flow proceeds to 814.

At 808, the CD driver 308 requests running tests in the local network. There are multiple local network(s) 101(1)-101(3) managed by different organizations. CD driver 308 has a name of organization. CD driver 308 sends a request message to the local network corresponding to the same organization. For example, CD driver 308 operated by organization 1 sends a request message to the local network 101(1) of organization 1. After sending a request, tests are executed in local network 101. CD driver 308 waits until a result from the local network is received.

At 809, the CD driver 308 receives a result from the event.

At 810, the CD driver 308 requests running tests in staging network 102. After sending a request, tests are executed in staging network 102. CD driver 308 waits until a result from staging network 102 is received.

At 811, the CD driver 308 requests signing for the artifact. All organizations have a signature application 307 within test tool 104. CD driver 308 sends a request message to the signature application 307 which is managed by the same organization. For example, CD driver 308 operated by organization 1 sends a request message to the signature application 307 of organization 1 as corresponding to test tool 104(1). After sending a request, a digital signature is put into the artifacts. CD driver 308 waits until a result from signature application 307 is received.

At 812, the CD driver 308 requests merging for the artifact. CD driver 308 sends artifacts to the production repository 109 with a merge request message. After sending a request, artifacts are merged to the production repository 109. CD driver 308 waits until a result from production repository 109 is received.

At 813, the CD driver 308 requests deployment for the artifact. All organizations have blockchain node(s) 107(1)-107(3) in production network 103. These nodes are the target of deployment. The deployment is done by each organization. CD driver 308 sends a request message to the operation tool 106(1)-106(3) which is managed by the same organization. For example, CD driver 308 operated by organization 1 sends a request message to the operation tool 106(1) of organization 1.

After sending a request, the operation tool deploys the artifact to the blockchain node(s) under its management. CD driver 308 waits until receiving a result from the operation tool.

At 814, the CD driver 308 create a transaction proposal message. A transaction proposal message includes changeID, jobID, organization and result.

An example structure of a transaction proposal message can be as follows:
{
 "changeID":"change05",
 "job_id":"updateLocal",
 "organization":" org1",
 "result":"success"
}

At 815, the CD driver 308 sends a proposal message to CD manager(s) 410. All organizations have CD manager(s) 410 on test blockchain node(s) 105 in staging network 103. CD driver 308 sends a proposal message to all CD manager(s) in the staging network 103. CD driver 308 waits until receiving a response from CD manager(s) 410.

At 816, the CD driver 308 receives a response from the CD manager(s) 410, and quits the process at 817.

Figure 9:
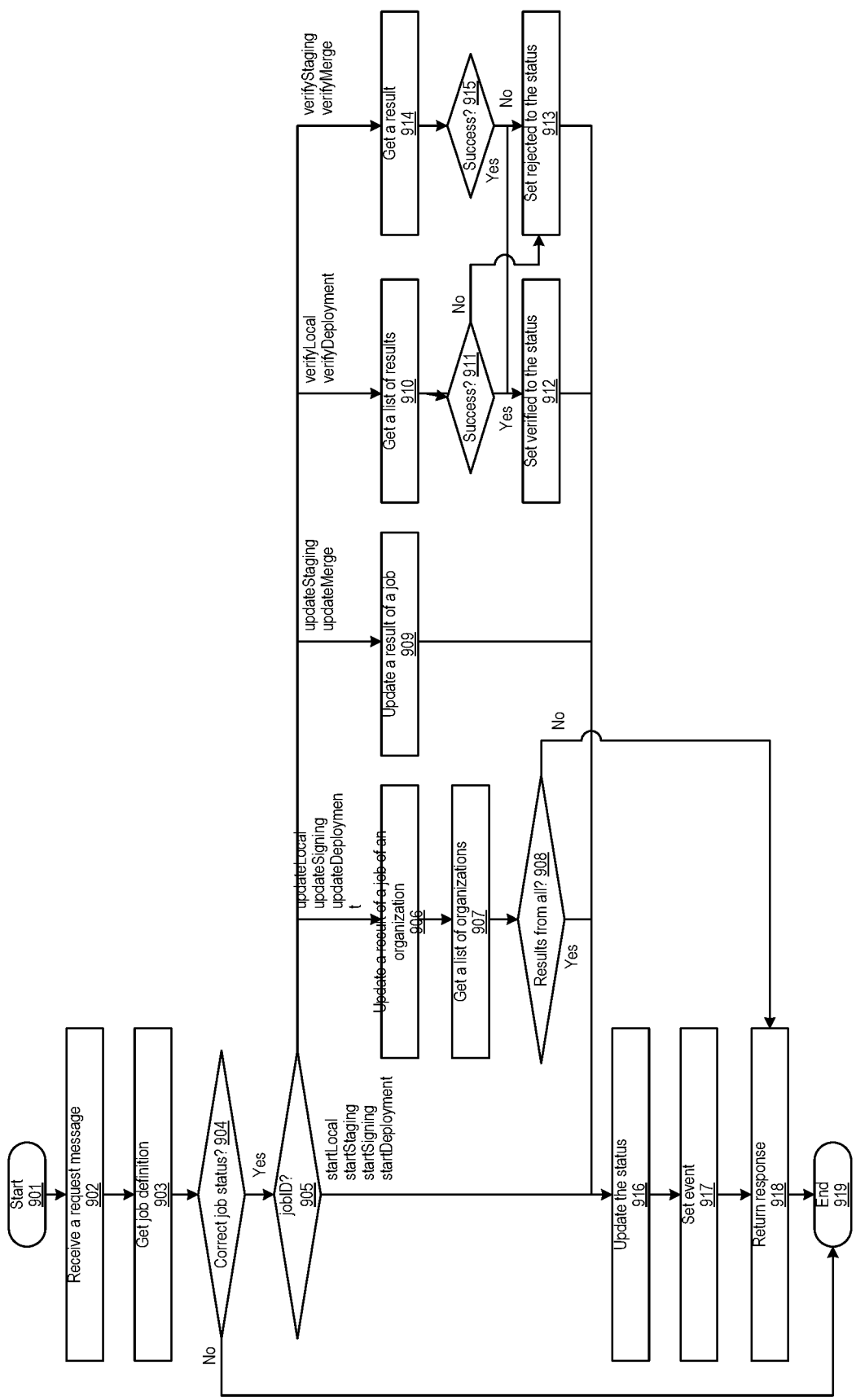
FIG. 9 is a flow diagram illustrating an example process of CD manager, in accordance with an example implementation.

FIG. 9 is a flow diagram illustrating an example process of CD manager 410, in accordance with an example implementation. CD manager 410 receives a request message, updates results of jobs, verifies the results of jobs, emits an event and return a response message. The process changes according to a jobID in the request message.

The flow is initiated at 901. At 902, the CD manager 410 receives a request message from CD driver 308. CD manager 410 extracts data from the request message.

At 903, the CD manager 410 gets a job definition for the request. CD manager 410 looks for the job definition table 500 with a jobID extracted from the request message. CD manager 410 gets status, nextJobID and assignee for the jobID.

At 904, CD manager 410 verifies if the job status is correct to execute the requested change. CD manager 410 looks for the status table 600 with a changeId extracted from the request message. CD manager 410 checks if the request message has the correct status. If the status is correct (Yes), then the flow proceeds to 905.

If the status is not correct (No), then the flow proceeds to 919. Since the request is invalid, the process ends without updating anything.

At 905, the CD manager 410 checks the value of jobID extracted from the request message. If the jobID matches startLocal, startStaging, startSigning or startDeployment, then the flow proceeds to 916. If the jobID matches updateLocal, updateSigning or updateDeployment, then the flow proceeds to 906. If the jobID matches updateStating or updateMerge, then the flow proceeds to 909. If the jobID matches verifyLocal or verifyDeployment, then the flow proceeds to 910. If the jobID matches verifyStating or verifyMerge, then the flow proceeds to 914.

At 906, the CD manager 410 updates a result of a job executed by an organization. Each organization runs operations for test in a local network, placing the digital signature to the artifact and deploying the artifact to the production network. As a result, each organization has its own result of a job. When CD driver 308 sends a request message to CD manger 410, the result of a job is included in the request message by each organization. CD manager 410 extracts the result of a job from the request message and puts a new record to log table 700.

At 907, the CD manager 410 gets a list for organizations within the blockchain network. The list of organizations is maintained by blockchain program(s) 407 and the data exists in ledger 408. CD manager 410 gets a list of organizations by accessing to the ledger 408.

At 908, the CD manager 410 looks for log table 700 and check if log table 700 has results from all organizations. If there are all results from all organizations in log table 700, then the flow proceeds to 916. If there are missing results from any organizations, then the flow proceeds to 918. Until all organizations submit the job results, CD manager 410 waits to update the status.

At 909, the CD manager 410 updates the result of a job. In an example, the test in the staging network and the merging of the artifact are operated once across the whole system. There is one result within a system. When CD driver 308 sends a request message to CD manger 410, the jb result is included in the request message. CD manager 410 extracts the job result from the request message and puts a new record to log table 700, and proceeds to 916.

At 910, the CD manager 410 looks for log table 700 with changeID and jobID and obtains a list of results. At 911, the CD manager 410 verifies if all results selected in Step 910 have success as a value of result. For tests in local network and deployment, log table 700 has a set of job results from all organizations. Before changing the status of CD pipeline, CD manager 410 checks if all organizations finished their jobs successfully. If all jobs are successful (Yes), CD manager 410 can change the status and proceeds to 912. If there is any job failure (No), CD manager 410 rejects changing the status and proceeds to 913. At 912, CD manager 410 sets "verified" as the value to the status. At 913, the CD manager 410 sets "rejected" as the value to the status.

At 914, the CD manager 410 looks for log table 700 with changeID and jobID and obtains the result. At 915, the CD manager 410 verifies if a result selected in 914 has success as a value of result. For tests in staging network and for merging artifacts, log table 700 stores the job. Before changing the status of CD pipeline, CD manager 410 checks if the job finished successfully. If the job is successful (Yes), CD manager 410 can change the status and proceeds to 912. If the job failed (No), CD manager 410 rejects changing the status and proceeds to 913.

At 916, the CD manager 410 updates the status in the status table 600. If the status is set to "rejected" in the previous step, the status table is also updated as "rejected". In other cases, the value of the status is equal to the status in the job definition.

At 917, the CD manager 410 sets an event to pass parameters for the next job. An event includes eventname and payload. Payload includes changeID and assignee.

An example structure of a transaction proposal message can be as follows:
{
  "eventname": "updateMerge",
  "changeID":"change05",
  "assignee":"Org1"
}

The value of eventname is equal to the nextJobID in the job definition.

The value of changeId extracted from the request message is passed to the changeID in the event. The value of assignee changes according to the assignPolicy in the job definition. If the assignPolicy is ALL_ORG, the assignee is set to null. If the assignPolicy is "ONE_ORG", the assignee is set to the name of organization selected randomly.

At 918, the CD manager 410 returns a response. The response contains the status code and message. Then at 919, the CD manager 410 quits the process.

FIG. 10 is a sequence diagram illustrating an example process of local stage, in accordance with an example implementation. In the local stage, an artifact is committed to the test repository 108, the pipeline is initiated, tests are executed in all local network 101 owned by different organizations, results are recorded in blockchain and the results are verified by CD manager(s) 410.

At 1001, the artifacts are pushed to test repository 108. Usually, a console is used to send artifacts from a machine where a developer writes code. At 1002, the test repository 108 generates changeID for the request initiated at 1001. ChangeID is used to track the status of the pipeline. At 1003, the test repository 108 emits the event for startLocal. An example of the event can be as follows:
{"eventname": "startLocal", "changeID":"change05", "assignee":"org1"}

The changeID is equal to the one generated at 1002. The assignee is the organization which pushed the artifact to the test repository 108. The event is broadcasted throughout the network 110.

At 1004, the CD driver 308 receives the event for startLocal because CD driver 308 is waiting for events. After receiving an event, CD driver 308 checks if the received event is assigned to the organization running CD driver 308. If the value of the assignee field in the event matches the organization running this CD driver 308, the event is assigned. CD driver 308 continues to run the next steps. If not assigned, CD driver 308 does not go to next steps and wait to receive events again.

At 1005, the CD driver 308 creates a transaction proposal message for startLocal and sends it to CD manager(s) 410. An example of the message can be as follows:
{"changeID":"change05", "job_id":"startLocal" }.

CD driver 308 sends the request to all CD manager(s) 410 owned by each organization in the staging network 102.

At 1006, the CD manager(s) 410 receives a request, updates the status in the status table 600 to localTestStarted and emits the event for updateLocal. An example of the event can be as follows:
{"eventname": "updateLocal", "changeID":"change05", "assignee":" "}

At 1007, the CD driver 308 receives the event for updateLocal. After receiving an event, CD driver 308 checks the assignee. Since the assignee field is empty, all organizations are assigned.

At 1008, the CD driver 308 requests running tests in the corresponding local network(s). CD driver 308 sends a request message to the local network owned by the organization matching the owner of the current CD driver 308. At 1009, the corresponding local network runs a series of test and returns the result to CD driver 308. If the tests are successful, the returned value is "success". If the tests failed, the returned value is "failure".

At 1010, the CD driver 308 creates a transaction proposal message for updateLocal and sends it to CD manager(s) 410. An example of the message can be as follows:
{"changeID":"change05", "job_id":"updateLocal", "organization":"org1", "result": "success" }.

The result of tests at 1009 is put as a value of the result field. CD driver 308 sends the request to all CD manager(s) 410 owned by each organization in the staging network 102.

At 1011, the CD manager(s) 410 receives a request, and puts the result of tests to log table 700. If this is the request from the last organization, CD manager(s) updates the status in the status table 600 to localTestEnded and emits the event for verifyLocal. An example of the event can be as follows:
{"eventname": "verifyLocal", "changeID":"change05", "assignee":"org2"}

At 1012, the CD driver 308 receives the event for verifyLocal. After receiving an event, CD driver 308 checks the assignee. If the value of the assignee field in the event matches the organization running this CD driver 308, the event is assigned. CD driver 308 then continues to the next steps. If not assigned, CD driver 308 does not continue to the next steps and waits to receive events again.

At 1013, the CD driver 308 creates a transaction proposal message for verifyLocal and sends it to CD manager(s) 410. An example of the message can be as follows:
{"changeID":"change05", "job_id":"verifyLocal" }.

CD driver 308 sends the request to all CD manager(s) 410 owned by each organization in the staging network 102.

At 1014, the CD manager(s) 410 receives a request and checks if all organizations finished their jobs successfully. If all tests are successful, CD manager(s) 410 updates the status in the status table 600 to localTestVerified and emits the event for startStaging. An example of the event can be as follows:
{"eventname": "startStaging", "changeID":"change05", "assignee":"org2"}

If there is any failure tests, CD manager(s) 410 updates the status in the status table 600 to be rejected and emits the error event. An example of the error event can be as follows:
{"eventname": "error", "changeID":"change05", "message":"verifyLocal is rejected."}

FIG. 11 is a sequence diagram illustrating an example process of the staging stage, in accordance with an example implementation. In the staging stage, tests are executed in staging network 102, results are recorded in blockchain and the results are verified by CD manager(s) 410. After that, the digital signature for the artifact is collected from all organizations and the signed artifact is pushed to production repository 109.

At 1101, the CD driver 308 receives the event for startStaging. After receiving an event, CD driver 308 checks the assignee. If the value of the assignee field in the event matches the organization running this CD driver 308, the event is assigned. CD driver 308 proceeds to the next steps. If not assigned, the CD driver 308 does not proceed to the next steps and waits to receive events again.

At 1102, the CD driver 308 creates a transaction proposal message for startStaging and sends it to CD manager(s) 410. An example of the message can be as follows:
{"changeID":"change05", "job_id":"startStaging" }.

CD driver 308 sends the request to all CD manager(s) 410 owned by each organization in the staging network 102.

At 1103, the CD manager(s) 410 receives a request, updates the status in the status table 600 to stagingTestStarted and emits the event for updateStaging. An example of the event can be as follows:
{"eventname": "updateStaging", "changeID":"change05", "assignee":"org3"}

At 1104, CD driver 308 receives the event for updateStaging. After receiving an event, CD driver 308 checks the assignee. If the value of the assignee field in the event matches the organization running this CD driver 308, the event is assigned. CD driver 308 continues next steps. If not assigned, CD driver 308 does not go to next steps and wait for receiving events again.

At 1105, the CD driver 308 requests for running tests in staging network 102. CD driver 308 initiates a series of test cases and send requests to smart contract(s) 409. At 1106, the smart contract(s) 409 runs a series of tests and returns the result to CD driver 308. If the tests are successful, the returned value is "success". If the tests failed, the returned value is "failure".

At 1107, the CD driver 308 creates a transaction proposal message for updateStaging and sends it to CD manager(s) 410. An example of the message can be as follows:
{"changeID":"change05", "job_id":"updateStaging", "organization":"org3", "result": "success"}.

The result of tests from 1106 is put as a value of the result field. CD driver 308 sends the request to all CD manager(s) 410 owned by each organization in the staging network 102.

At 1108, the CD manager(s) 410 receives a request, puts the result of tests to log table 700, updates the status in the status table 600 to stagingTestEnded and emits the event for verify Staging. An example of the event can be as follows:
{"eventname": "verifyStaging", "changeID":"change05", "assignee":"org2"}

At 1109, the CD driver 308 receives the event for verifyStaging. After receiving an event, CD driver 308 checks the assignee. If the value of the assignee field in the event matches the organization running this CD driver 308, the event is assigned. CD driver 308 continues to the next steps. If not assigned, the CD driver 308 does not continue to the next steps and waits to receive events again.

At 1110, CD driver 308 creates a transaction proposal message for verifyStaging and sends it to CD manager(s) 410. The message looks like:
{"changeID":"change05", "job_id":"verifyStaging" }.

CD driver 308 sends the request to all CD manager(s) 410 owned by each organization in the staging network 102.

At 1111, the CD manager(s) 410 receives a request and checks if a job finished successfully. If the job is successful, CD manager(s) 410 updates the status in the status table 600 to stagingTestVerified and emits the event for startSigning. An example of the event can be as follows:
{"eventname": "startSigning", "changeID":"change05", "assignee":"org3"}

If the job failed, CD manager(s) 410 updates the status in the status table 600 to rejected and emits the error event. An example of the event can be as follows:
{"eventname": "error", "changeID":"change05", "message":"verifyStaging is rejected."}

At 1112, the CD driver 308 receives the event for startSigning. After receiving an event, CD driver 308 checks the assignee. If the value of the assignee field in the event matches the organization running this CD driver 308, the event is assigned. CD driver 308 continues to the next steps. If not assigned, CD driver 308 does not continue to the next steps and wait to receive events again.

At 1113, the CD driver 308 creates a transaction proposal message for startSigning and sends it to CD manager(s) 410. An example of the message can be as follows:
{"changeID":"change05", "job_id":"startSigning" }.

CD driver 308 sends the request to all CD manager(s) 410 owned by each organization in the staging network 102.

At 1114, the CD manager(s) 410 receives a request, updates the status in the status table 600 to signStarted and emits the event for updateSigning. An example of the event can be as follows:
{"eventname": "updateSigning", "changeID":"change05", "assignee": " "}

At 1115, the CD driver 308 receives the event for updateSigning. After receiving an event, CD driver 308 checks the assignee. Since the assignee field is empty, all organizations are assigned.

At 1116, the CD driver 308 requests the signing of the artifacts. CD driver 308 sends a request message to signature application 307 owned by the organization matching the owner of the current CD driver 308.

At 1117, the signature application 307 puts a digital signature to the artifact and returns the signature to CD driver 308.

At 1118, the CD driver 308 creates a transaction proposal message for updateSigning and sends it to CD manager(s) 410. An example of the message can be as follows:
{"changeID":"change05", "job_id":"updateLocal", "organization":"org1", "signature": "43u81lke542pa23pfsd242390"}.

The returned signature from 1117 is put as a value of the signature field.

CD driver 308 sends the request to all CD manager(s) 410 owned by each organization in the staging network 102.

At 1119, the CD manager(s) 410 receives a request, and puts the result of the signature to log table 700. If this is the request from the last organization, CD manager(s) updates the status in the status table 600 to signEnded and emits the event for updateMerge. An example of the event can be as follows:
{"eventname": "updateMerge", "changeID":"change05", "assignee":"org1"}

At 1120, the CD driver 308 receives the event for updateMerge. After receiving an event, CD driver 308 checks the assignee. If the value of the assignee field in the event matches the organization running this CD driver 308, the event is assigned. CD driver 308 proceeds to the next steps. If not assigned, CD driver 308 does not continue to the next steps and waits to receive events again.

At 1121, the CD driver 308 requests merging artifacts. CD driver 308 sends a push request with signed artifact to production repository 109. At 1122, the production repository 109 merges the received artifacts and returns a response message to CD driver 308. At 1123, the CD driver 308 creates a transaction proposal message for updateMerge and sends it to CD manager(s) 410. An example of such a message can be as follows:
{"changeID":"change05", "job_id":"updateMerge"}.

CD driver 308 sends the request to all CD manager(s) 410 owned by each organization in the staging network 102.

At 1124, the CD manager(s) 410 receives a request, updates the status in the status table 600 to artifactMerged and emits the event for startDeployment. An example of the event can be as follows:
{"eventname": "startDeployment", "changeID": "change05", "org3"}

FIG. 12 is a sequence diagram illustrating an example process of the deployment stage, in accordance with an example implementation. In the deployment stage, artifacts are deployed to the production network 103, results of deployment are recorded in blockchain and the results are verified by CD manager(s) 410.

At 1201, the CD driver 308 receives the event for startDeployment. After receiving an event, CD driver 308 checks the assignee. If the value of the assignee field in the event matches the organization running this CD driver 308, the event is assigned. CD driver 308 continues to the next steps. If not assigned, then the CD driver 308 does not continue to the next steps and waits to receive events again.

At 1202, the CD driver 308 creates a transaction proposal message for startDeployment and sends it to CD manager(s) 410. An example of such a message can be as follows:
{"changeID":"change05", "job_id":"startDeployment" }.

The CD driver 308 sends the request to all CD manager(s) 410 owned by each organization in the staging network 102.

At 1203, the CD manager(s) 410 receives a request, updates the status in the status table 600 to deployStarted and emits the event for updateDeployment. An example of the event can be as follows:
{"eventname": "updateDeployment", "changeID": "change05", "assignee":" "}

At 1204, the CD driver 308 receives the event for updateDeployment. After receiving an event, CD driver 308 checks the assignee. Since the assignee field is empty, all organizations are assigned.

At 1205, the CD driver 308 requests deployment of the artifacts to operation tool 106(1)-106(3). Every organization has their corresponding operation tool to deploy artifacts on their own blockchain node(s). To make each organization deploy artifacts, CD driver 308 sends a request message to operation tool owned by the organization matching the owner of the current CD driver 308. At 1206, the operation tool gets the merged artifacts from production repository 109.

At 1207, the operation tool deploys the artifacts to blockchain node(s) and receives the deployment results. If the deployment is successful, the returned value is "success". If the deployment failed, the returned value it "failure". Operation tool also returns the result to CD driver 308.

At 1208, the CD driver 308 creates a transaction proposal message for updateDeployment and sends it to CD manager(s) 410. An example of the message can be as follows:
{"changeID":"change05", "job_id":"updateDeployment", "result": "success"}.

The result of deployment from 1207 is put as a value of the result field. CD driver 308 sends the request to all CD manager(s) 410 owned by each organization in the staging network 102.

At 1209, the CD manager(s) 410 receives a request, put the result of deployment to log table 700. If this is the request from the last organization, CD manager(s) updates the status in the status table 600 to deployEnded and emits the event for verifyDeployment. An example of such an event can be as follows:
{"eventname": "verifyDeployment", "changeID": "change05", "assignee":"org3"}

At 1210, the CD driver 308 receives the event for verifyDeployment. After receiving an event, CD driver 308 checks the assignee. If the value of the assignee field in the event matches the organization running this CD driver 308, the event is assigned. CD driver 308 continues to the next steps. If not assigned, CD driver 308 does not continue to the next steps and waits to receive events again.

At 1211, the CD driver 308 creates a transaction proposal message for verifyDeployment and sends it to CD manager(s) 410. An example of the message can be as follows:
{"changeID":"change05", "job_id":"verifyDeployment" }.

The CD driver 308 sends the request to all CD manager(s) 410 owned by each organization in the staging network 102.

At 1212, the CD manager(s) 410 receives a request and checks if all organizations finished deployment successfully. If all deployments are successful, CD manager(s) 410 updates the status in the status table 600 to deployVerified and emits the event for finished. An example of the event can be as follows:
"eventname": "finished", "changeID":"change05", "assignee":" "

If there are any deployment failures, the CD manager(s) 410 updates the status in the status table 600 to rejected and emits the error event. An example of the event can be as follows:

"eventname": "error", "changeID":"change05", "message": "verifyDeployment is rejected."

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for managing deployment of source code to a production repository across a plurality of independently managed entities through a blockchain, the method comprising:
   for a submission of the source code for deployment:
      testing the source code on a first network that is local to each of the plurality of independently managed entities;
         for results of the testing being verified in the blockchain as valid:
            conducting staging on a second network to verify the testing across each of the plurality of independently managed entities;
            for results of the staging being signed by each of the plurality of independently managed entities in the blockchain, deploying the source code in a third network configured to deploy the source code to each of the plurality of independently managed entities;
   wherein the conducting staging on the second network to verify the testing across each of the plurality of independently managed entities comprises:
      executing a test of the source code on the second network through smart contracts between each of the plurality of independently managed entities;
      for ones of the smart contracts indicating the test to be successful, execute a signing on the blockchain between the ones of the plurality of independently managed entities associated with the ones of the smart contracts indicating the test to be successful; and
      merging signatures from the signing into the production repository;
   wherein the first network, the second network, and the third network are different networks.

2. The method of claim 1, further comprising deploying the source code to the production repository for verification from the plurality of independently managed entities that deployment of the source code in the third network is successful.

3. The method of claim 1, wherein the testing the source code on the first network that is local to each of the plurality of independently managed entities comprises:
   deploying the source code to a test repository;
   executing a test of the source code on the first network that is local to each of the plurality of independently managed entities;
   for results of the test of the source code on the first network provided from the plurality of independently managed entities as being successful, verifying the results of the testing in the blockchain as being valid.

4. The method of claim 1, wherein the deploying the source code in the third network configured to deploy the source code to each of the plurality of independently managed entities comprises:
   obtaining merged signatures of the plurality of independently managed entities from the production repository associated with the results of the staging;
   deploying the merged signatures to the blockchain;
   deploying the source code to each of the plurality of independently managed entities; and
   for verification of successful deployment of the source code to each of the plurality of entities, maintaining deployment of the source code in the production repository.

5. The method of claim 1, wherein the testing the source code on the first network, conducting staging on the second network, and deploying the source code on the third network is executed in order.

6. A non-transitory computer readable medium, storing instructions for managing deployment of source code to a production repository across a plurality of independently managed entities through a blockchain, the instructions comprising:
   for a submission of the source code for deployment:
      testing the source code on a first network that is local to each of the plurality of independently managed entities;
      for results of the testing being verified in the blockchain as valid:
         conducting staging on a second network to verify the testing across each of the plurality of independently managed entities;
         for results of the staging being signed by each of the plurality of independently managed entities in the blockchain, deploying the source code in a third network configured to deploy the source code to each of the plurality of independently managed entities;
   wherein the conducting staging on the second network to verify the testing across each of the plurality of independently managed entities comprises:
      executing a test of the source code on the second network through smart contracts between each of the plurality of independently managed entities;
      for ones of the smart contracts indicating the test to be successful, execute a signing on the blockchain between the ones of the plurality of independently managed entities associated with the ones of the smart contracts indicating the test to be successful; and
      merging signatures from the signing into the production repository;
   wherein the first network, the second network, and the third network are different networks.

7. The non-transitory computer readable medium of claim 6, further comprising deploying the source code to the production repository for verification from the plurality of independently managed entities that deployment of the source code in the third network is successful.

8. The non-transitory computer readable medium of claim 6, wherein the testing the source code on the first network that is local to each of the plurality of independently managed entities comprises:
   deploying the source code to a test repository;
   executing a test of the source code on the first network that is local to each of the plurality of independently managed entities;
   for results of the test of the source code on the first network provided from the plurality of independently managed entities as being successful, verifying the results of the testing in the blockchain as being valid.

9. The non-transitory computer readable medium of claim 6, wherein the deploying the source code in the third network configured to deploy the source code to each of the plurality of independently managed entities comprises:
   obtaining merged signatures of the plurality of independently managed entities from the production repository associated with the results of the staging;
   deploying the merged signatures to the blockchain;
   deploying the source code to each of the plurality of independently managed entities; and
   for verification of successful deployment of the source code to each of the plurality of entities, maintaining deployment of the source code in the production repository.

10. The non-transitory computer readable medium of claim 6, wherein the testing the source code on the first network, conducting staging on the second network, and deploying the source code on the third network is executed in order.

* * * * *